United States Patent
Liu et al.

(10) Patent No.: US 10,163,232 B2
(45) Date of Patent: Dec. 25, 2018

(54) TOMOGRAPHIC RECONSTRUCTION SYSTEM

(71) Applicant: Purdue Research Foundation, West Lafayette, IN (US)

(72) Inventors: Junshi Liu, West Lafayette, IN (US); Swagath Venkataramani, West Lafayette, IN (US); Singanallur V. Venkatakrishnan, Orinda, CA (US); Charles A. Bouman, West Lafayette, IN (US); Anand Raghunathan, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 15/063,054

(22) Filed: Mar. 7, 2016

(65) Prior Publication Data

US 2016/0260230 A1 Sep. 8, 2016

Related U.S. Application Data

(60) Provisional application No. 62/129,018, filed on Mar. 5, 2015.

(51) Int. Cl.
*G06K 9/00* (2006.01)
*G06T 11/00* (2006.01)

(52) U.S. Cl.
CPC ....... *G06T 11/006* (2013.01); *G06T 2211/424* (2013.01); *G06T 2211/432* (2013.01)

(58) Field of Classification Search
CPC ............. G06T 11/006; G06T 2211/424; G06T 2211/416; G06T 2211/432
See application file for complete search history.

(56) References Cited

U.S. PATENT DOCUMENTS

| | | | |
|---|---|---|---|
| 2008/0095300 A1* | 4/2008 | Zingelewicz | G01N 23/04 378/4 |
| 2011/0299745 A1* | 12/2011 | Roberts | G06T 7/149 382/128 |
| 2012/0155729 A1* | 6/2012 | Benson | G06T 11/006 382/131 |

OTHER PUBLICATIONS

C.A. Bouman, "Model Based Image Processing", https://engineering.purdue.edu/~bouman/publications/pdf/MBIP-book.pdf, 1st edition, pp. 1-423, 2013.

(Continued)

*Primary Examiner* — Brian Werner
*Assistant Examiner* — Ian L Lemieux
(74) *Attorney, Agent, or Firm* — Purdue Research Foundation

(57) ABSTRACT

A tomography system having a central processing unit, a system memory communicatively connected to the central processing unit, and a hardware acceleration unit communicatively connected to the central processing unit and the system memory, the hardware accelerator configured to perform at least a portion of an MBIR process on computer tomography data. The hardware accelerator unit may include one or more voxel evaluation modules which evaluate an updated value of a voxel given a voxel location in a reconstructed volume. By processing voxel data for voxels in a voxel neighborhood, processing time is reduces.

14 Claims, 6 Drawing Sheets

(56) References Cited

OTHER PUBLICATIONS

S.J. Kisner, P.Jin, C.A. Bouman, K. Sauer, W. Garms, T. Gable, S. Oh, M. Merzbacher, and S. Skatter, "Innovative data weighting for iterative reconstruction in a helical ct security baggage scanner", In Security Technology (ICCST), 2013 47th International Carnahan Conference, pp. 1-5, 2013.

E. A. Smith, J. R. Dillman, M. M. Goodsitt, E. G. Christodoulou, N. Keshavarzi, and P. J. Strouse, "Model-based iterative reconstruction:Effect on patient radiation dose and image quality in pediatric body ct.", In Radiology, pp. 526-534, 2014.

M. Katsura, I. Matsuda, M. Akahane, J. Sato, H. Akai, K. Yasaka, A. Kunimatsu, K. Ohtomo, "Model-based iterative reconstruction technique for radiation dose reduction in chest ct: comparison with the adaptive statistical iterative reconstruction technique", European Radiology, 22(8): pp. 1613-1623, 2012.

C.A. Bouman, K. Sauer, "A unified approach to statistical tomography using coordinate descent optimization". Image Processing, IEEE Transactions, 5(3): pp. 480-492, 1996.

S.V. Venkatakrishnan, L.F. Drummy, M.A. Jackson, M. De Graef, J. Simmons, C.A. Bouman, "A model based iterative reconstruction algorithm for high angle annular dark field-scanning transmission electron microscope (haadf-stem) tomography", Image Processing, IEEE Transactions, 22(11): pp. 4532-4544, 2013.

S.V. Venkatakrishnan, L.F. Drummy, M. Jackson, M. De Graef, J. Simmons, C.A. Bouman, "Model-based iterative reconstruction for bright field electron tomography", Computational Imaging, IEEE Transactions, pp. (99):1-1, 2014.

K.A. Mohan, S.V. Venkatakrishnan, L.F. Drummy, J. Simmons, D.Y. Parkinson, and C.A. Bouman, :"Model-based iterative reconstruction for synchrotron x-ray tomography", In Acoustics, Speech and Signal Processing (ICASSP), 2014 IEEE International Conference pp. 6909-6913, 2014.

P. A. Midgley and R. E. Dunin-Borkowskil, "Electron tomography and holography in materials science", Nature Materials, 8(4): pp. 271-280, 2009.

J.A. Fessler, S.D. Booth, "Conjugate-gradient preconditioning methods for shift-variant pet image reconstruction", Image Processing, IEEE Transactions, 8(5), pp. 688-699, 1999.

J.A. Fessler, "Penalized weighted least-squares image reconstruction for positron emission tomography", Medical Imaging, IEEE Transactions, 13(2), pp. 290-300, 1994.

H. M. Hudson and R.S. Larkin, "Accelerated image reconstruction using ordered subsets of projection data", Medical Imaging, IEEE Transaction, 13(4), pp. 601-609, 1994.

S. V. Venkatakrishnan, L. F. Drummy, M. De Graef, J. P. Simmons, C. A. Bouman, "Model based iterative reconstruction for bright field electron tomography", vol. 8657, pp. 86570A-86570A-12, 2013.

Ge heathcare veo website: http://www3.gehealthcare.com/en/Products/Categories/ComputedTomography/DiscoveryCT750 HD/Veo. New levels of ct image performance and new levels in radiation dosemanagement: Advanced image reconstruction algorithm running on intel xeon processors. In Intel/GE Healthcare white paper, 2011.

J. Zheng, S.S. Saquib, K. Sauer, C.A. Bouman, "Parallelizable Bayesian tomography algorithms with rapid, guaranteed convergence", Image Processing, IEEE Transactions, 9(10), pp. 1745-1759, 2000.

Z. Yu, J. Thibault, C.A. Bouman, K.D. Sauer, J. Hsieh, "Fast model-based X-ray CT reconstruction using spatially nonhomogeneous ICD optimization", 20(1), pp. 161-175, 2011.

S.T. Chakradhar, A. Raghunathan, "Best-effort computing: Rethinking parallel software and hardware", In Design Automation Conference (DAC), 2010 47th ACM/IEEE, pp. 865-870, 2010.

V. K. Chippa, S. T. Chakradhar, K. Roy, A. Raghunathan, "Analysis and characterization of inherent application resilience for approximate computing", In Proceedings of the 50th Annual Design Automation Conference, DAC '13, pp. 113:1-113, pp. 9, 2013.0.

J. Thibault, K. D. Sauer, C. A. Bouman, J. Hsieh, "A three-dimensional statistical approach to improved image quality for multislice helical CT", Medical Physics, 34(11): pp. 4526-4544, 2007.

De5 development and education board: http://www.altera.com/education/univ/materials/boards/de5/unv-de5-board.html.

K. Park, L. F. Drummy, R. C. Wadams, H. Koerner, D. Nepal, L. Fabris, R. A. Vaia, "Growth mechanism of gold nanorods", Chemistry of Materials, 25(4), pp. 555-563, 2013.

J. Li, C. Papachristou, R. Shekhar. "An fpga-based computing platform for real-time 3d medical imaging and its application to cone-beam ct reconstruction", J. Imaging Science and Technology, 49, pp. 237-245, 2005.

J. Chen, J. Cong, M. Yan, Y Zou, "Fpga-accelerated3d reconstruction using compressive sensing", In Proceedings of the ACM/SIGDA International Symposium on Field Programmable Gate Arrays, FPGA '12, pp. 163-166, 2012.

J. Chen, J. Cong, L.A. Vese, J. Villasenor, M. Yan, Yi Zou, "A hybrid architecture for compressive sensing 3-d ct reconstruction", Emerging and Selected Topics in Circuits and Systems, IEEE Journal, 2(3) pp. 616-625, 2012.

G. Dasika, K. Fan, S. Mahlke, "Power-efficient medical image processing using puma", In Application Specific Processors, SASP '09. IEEE 7th Symposium, pp. 29-34, 2009.

G. Dasika, A. Sethia, V. Robby, Trevor Mudge, S. Mahlke, "Medics: Ultra-portable processing for medical image reconstruction", In Proceedings of the 19th International Conference on Parallel Architectures and Compilation Techniques, PACT '10, pp. 181-192, 2010.

J. K. Kim, J.A. Fessler, Z. Zhang, "Forward-projection architecture for fast iterative image reconstruction in x-ray ct", Signal Processing, IEEE Transactions, 60(10), pp. 5508-5518, 2012.

J. K. Kim, Z. Zhang, J.A. Fessler, "Hardware acceleration of iterative image reconstruction for x-ray computed tomography", In Acoustics, Speech and Signal Processing (ICASSP), 2011 IEEE International Conference, pp. 1697-1700, 2011.

B. De Man, S. Basu, J.-B. Thibault, Jiang Hsieh, J.A. Fessier, C. Bouman, K. Sauer, "A study of four minimization approaches for iterative reconstruction in x-ray ct", In Nuclear Science Symposium Conference Record, 2005 IEEE, vol. 5, pp. 2708-2710, 2005.

R. Sampson, M. Yang, S. Wei, C. Chakrabarti, T. F. Wenisch, Sonic millip3de: A massively parallel 3d-stacked accelerator for 3d ultrasound:, In Proceedings of the 2013 IEEE 19th International Symposium on High Performance Computer Architecture (HPCA), HPCA '13, pp. 318-329, 2013.

M. Birk, M. Zapf, M. Balzer, N. Ruiter, J. Becker, "A comprehensive comparison of gpu- and fpga-based acceleration of reflection image reconstruction for 3d ultrasound computer tomography", J. Real-Time Image Process., 9(1) pp. 159-170, 2014.

R. Farivar, A. Raghunathan, S. Chakradhar, H. Kharbanda, R.H. Campbell, "Pic: Partitioned iterative convergence for clusters", In Cluster Computing (CLUSTER), 2012 IEEE International Conference, pp. 391-401, 2012.

* cited by examiner

TOMOGRAPHIC RECONSTRUCTION SYSTEM

RELATED APPLICATIONS

The present patent application is related to and claims the priority benefit of U.S. Provisional Patent Application Ser. No. 62/129,018, filed Mar. 5, 2015, the contents of which is hereby incorporated by reference in its entirety into the present disclosure.

GOVERNMENT RIGHTS

This invention was made with government support under Grant Number CNS-1018621 awarded by National Science Foundation. The government has certain rights in the invention.

TECHNICAL FIELD

The present application relates to tomography imaging devices, e.g., computed tomography devices, and to tomography control systems.

BACKGROUND

Tomographic reconstruction is an important inverse problem in a wide range of imaging systems, including medical scanners, explosive detection systems and electron and X-ray microscopy for scientific and materials imaging. The objective of tomographic reconstruction is to compute a three-dimensional volume (a physical object or a scene) from two-dimensional observations that are acquired using an imaging system. An example of tomographic reconstruction is found in computed tomography (CT) scans, in which X-ray radiation is passed from several angles to record 2D radiographic images of specific parts of the scanned patient. These radiographic images are then processed using a reconstruction algorithm to form a 3D volumetric view of the scanned region, which is subsequently used for medical diagnosis.

Model Based Iterative Reconstruction (MBIR) is a promising approach to realize tomographic reconstruction. The MBIR framework formulates the problem of reconstruction as minimization of a high-dimensional cost function, in which each voxel in the 3D volume is a variable. An iterative algorithm is employed to optimize the cost function such that a pre-specified error threshold is met.

MBIR has demonstrated state-of-the art reconstruction quality on various applications and has been utilized commercially in GE's healthcare systems. In addition to improved image quality, MBIR has enabled significant reduction in X-ray dosage in the context of lung cancer screening (~80% reduction) and pediatric imaging (30-50% reduction). In other application domains, MBIR offers additional advantages such as improved output resolution, precise definition with reduced impact of undesired artifacts in images, and the ability to reconstruct even with sparse view angles. These capabilities are extremely critical in applications such as explosive detection systems (e.g. baggage and cargo scanners), where there is a need to reduce cost due to false alarm rates, operate under non-ideal view angles, and extend deployed systems to cover new threat scenarios.

While MBIR shows great potential, its high compute and data requirements are key bottlenecks to its widespread commercial adoption. For instance, reconstructing a 512×512×256 volume of nanoparticles viewed from different angles through an electron microscope requires 50.33 GOPS (Giga operations) and 15 G memory accesses per iteration of MBIR. Further, the algorithm may take 10s of iterations to converge depending on the threshold. Clearly, this places significant compute demand. One tested software implementation required ~1700 seconds per iteration on a 2.3 GHz AMD Opteron server with 196 GB memory, which is unacceptable for many practical applications. Thus, technologies that enable orders of magnitude improvement in MBIR's implementation efficiency are needed.

SUMMARY

According to various aspects, a tomography system is provided, comprising a central processing unit, a system memory communicatively connected to the central processing unit and a hardware acceleration unit communicatively connected to the central processing unit and the system memory, the hardware accelerator configured to perform at least a portion of an MBIR process on computer tomography data. The system may comprise one or more voxel evaluation modules that evaluates an updated value of a voxel given a voxel location in a reconstructed volume. The operations may further include determining a reconstructed image for the selected voxel using the updated value of the voxel. The system may also include a computer tomography scanner, wherein the computer tomography scanner is configured to irradiate a test object, measure resulting radiation, and provide measured data corresponding to the resulting radiation.

BRIEF DESCRIPTION OF THE DRAWINGS

In the following description and drawings, identical reference numerals have been used, where possible, to designate identical features that are common to the drawings.

The attached drawings are for purposes of illustration and are not necessarily to scale.

DETAILED DESCRIPTION

X-ray computed tomography, positron-emission tomography, and other tomography imaging systems are referred to herein generically as "CT" systems.

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
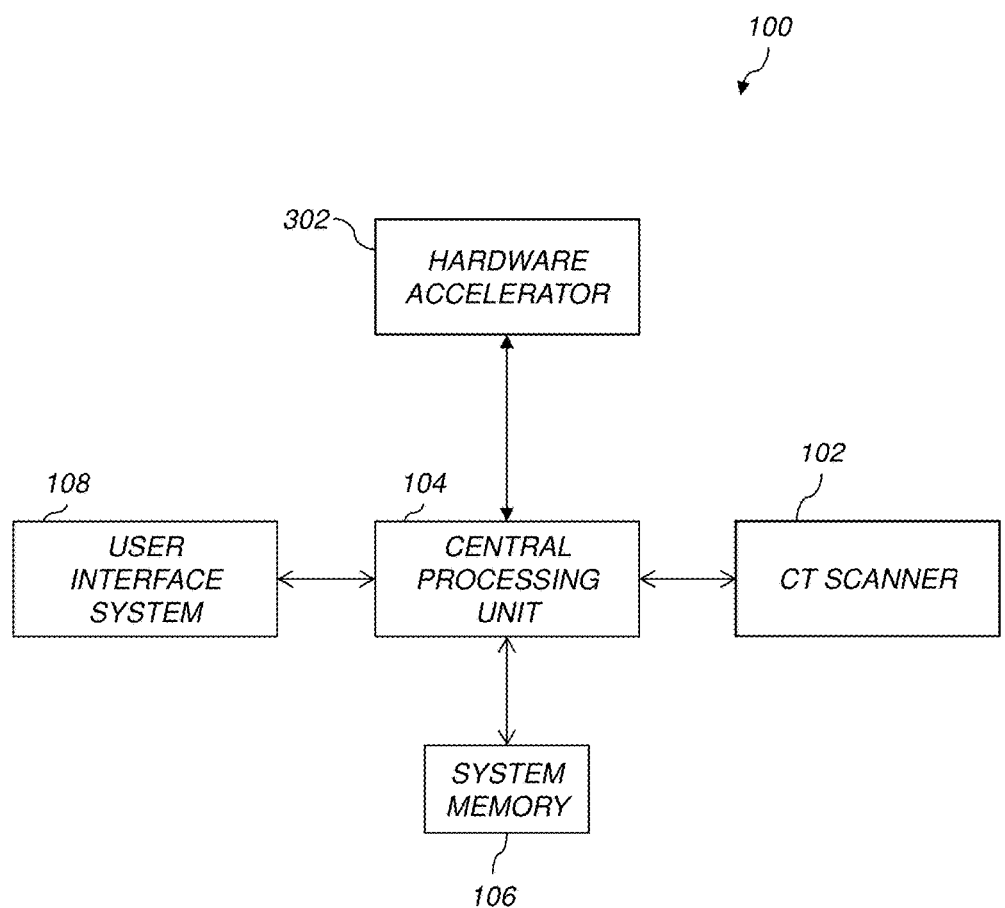
FIG. 1 is a diagram showing the components of an example tomography system according to one embodiment.

FIG. 1 shows a tomography system 100 according to one embodiment. As shown, the system 100 includes a CT scanner 102, a central processing unit 104, a system memory 106, a tomography hardware accelerator unit 302, and a user interface 108. The CT scanner 102 may include a rotating gantry having an x-ray radiation source and sensors which direct radiation to an object being scanned at various angles to record 2D radiographic images. The various components shown in FIG. 1 may be communicatively connected by an electronic network.

Central processing unit 104, hardware accelerator unit 302, and other processors described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

System memory 106 can be a tangible non-transitory computer-readable storage medium, i.e., a non-transitory device or article of manufacture that participates in storing instructions that can be provided to central processing unit 104 or hardware accelerator unit 302 for execution. In one example, the system memory 106 comprises random access memory (RAM). In other examples, the system memory 106 may comprise a hard disk drive.

The phrase "communicatively connected" includes any type of connection, wired or wireless, for communicating data between devices or processors. These devices or processors can be located in physical proximity or not.

To better illustrate the technical challenges involved in the implementation of MBIR, an explanation of the mathematical concepts behind the algorithm will be provided. In order to describe the MBIR approach, it is useful to think of all the 2D images (measurements) as well as the unknown 3D volume of voxels as one-dimensional vectors. If y is a M×1 vector containing all the measurements, x is a N×1 vector containing all the voxels in the 3D volume, and A is a sparse M×N matrix implementing the line integral through the 3D volume, then the MBIR reconstruction is obtained by minimizing the following function, $$c(x) = \frac{1}{2}\|y - Ax\|_\Lambda^2 + \beta \sum_{r,s \in N_s} w_{rs}\rho(x_s - x_r) \quad (1)$$

where N represents the set of all pairs of neighboring voxels in 3D (using say a 26 point neighborhood system), $\rho(\cdot)$ is a potential function that incorporates a model for the underlying image, $\Lambda$ is a diagonal matrix whose entries weight each term by a factor inversely proportional to the noise in the measurement, and $\omega_{rs}$ is a set of normalized weights depending on the physical distance between neighboring voxels. The first term in equation (1) has the interpretation of enforcing consistency of the desired reconstruction with the measurements while the second term enforces certain desirable characteristics in the reconstruction (sharp edges, low-noise etc.). The term y-Ax, which represents the difference between the original 2D measurements and the 2D projections obtained from the 3D volume, is called the error sinogram (e).

While several variants of the MBIR algorithm exist based on how the cost function is minimized, a popular variant called the Iterative Coordinate Descent MBIR (ICD-MBIR) is considered. The basic idea in ICD is to update the voxels one at a time so as to monotonically decrease the value of the original function (equation (1)) with each update. Since the cost function is convex and is bounded from below, this method converges to the global minimum.

The cost function in equation (1) with respect to a single voxel (ignoring constants) indexed by s is given by $$c_s(z) = \theta_1 z + \frac{\theta_2}{2}(z - x_s)^2 + \sum_{r \in N_s} w_{rs}\rho(z - x_r) \quad (2)$$

$$\theta_1 = -e^t \Lambda A_{*,s}, \quad \theta_2 = A_{*,s}^t \Lambda A_{s,*} \quad (3)$$

where $A^*_{,s}$ is the $s^{th}$ column of A, e=y-Ax and $x_s$ is the current value of the voxel s.

Due to the complicated nature of the function $\rho(\ )$ it is typically not possible to find a simple closed form expression for the minimum of (2). Hence, ( ) often replaced by a quadratic surrogate function which makes (2) simpler to minimize. In particular if $$a_{rs} = \begin{cases} \frac{\rho'(x_r - x_s)}{(x_r - x_s)} & x_s \neq x_r \\ \rho''(0) & x_s = x_r \end{cases} \quad (4)$$

then an overall surrogate function to (2) is given by $$c_s(z) = \theta_1(z - x_s) + \theta_2(z - x_s)^2 + \sum_{r \in N_s} w_{rs}a_{rs}(z - x_r)^2 \quad (5)$$

Taking the derivative of this surrogate function and setting it to zero, it can be verified that the minimum of the function is $$z^* \leftarrow \frac{\theta_2 x_s - \theta_1 + \sum_{r \in N_s} w_{rs}a_{rs}x_r}{\theta_2 + \sum_{r \in N_s} w_{rs}a_{rs}}. \quad (6)$$

Note that minimizing (5) ensures a decrease of (2) and hence that of the original function (1). The algorithm can be efficiently implemented by keeping track of the error sinogram e along with each update.

Steps of an MBIR process according to one embodiment are summarized in Table 1 below.

TABLE 1

Input: 2D Measurements: y
Output: Reconstructed 3D volume: x
1: Initialize x at random
2: Error Sinogram: e = y − Ax
3: while Convergence criteria not met do
4:   for each voxel u in random order do TABLE 1-continued

```
 5:    θ₁ and θ₂ = f(e, A*,ᵥ)
 6:    for voxels u ∈ neighborhood Nᵥ of v do
 7:        Compute surrogate fn. a_{u,v} for u (Eqn. 5)
 8:    end for
 9:    Compute z* = g(θ₁, θ₂, xᵥ, a*,ᵥ) (Eqn. 7)
10:    Update Error Sinogram: e ← e − (z* − xᵥ)A*,ᵥ
11:    Update voxel: xᵥ ← z*
12:   end for
13: end while
```

Given a set of 2D measurements (y) as inputs, the process produces the reconstructed 3D volume (x) at the output. First, the voxels in x are initialized at random (line 1). Next the error sinogram (e) is computed as the difference between the 2D measurements and the 2D views obtained by projecting the current 3D volume. The process iteratively updates the voxels (lines 4-13) until the convergence criteria is met. In each iteration, every voxel in the volume is updated once in random order.

Lines 5-11 of the process in Table 1 describe the steps involved in updating a voxel. First, the parameters $\theta_1$ and $\theta_2$ are computed using the A matrix and the error sinogram e (line 5). Next, the quadratic surrogate function is evaluated for each of the voxel neighbors (lines 6-8). These are utilized to compute the new value of the voxel z* (line 9). The error sinogram (e) and the 3D volume (x) are then updated the new voxel value (lines 10-11).

ICD-MBIR offers several advantages over other MBIR variants: (i) It takes lower number of iterations to converge, thereby enabling faster runtimes, and (ii) It is general and can be easily adopted for a variety of applications with different geometries, noise statistics and image models, without the need for custom algorithmic tuning for each application.

Figure 2:
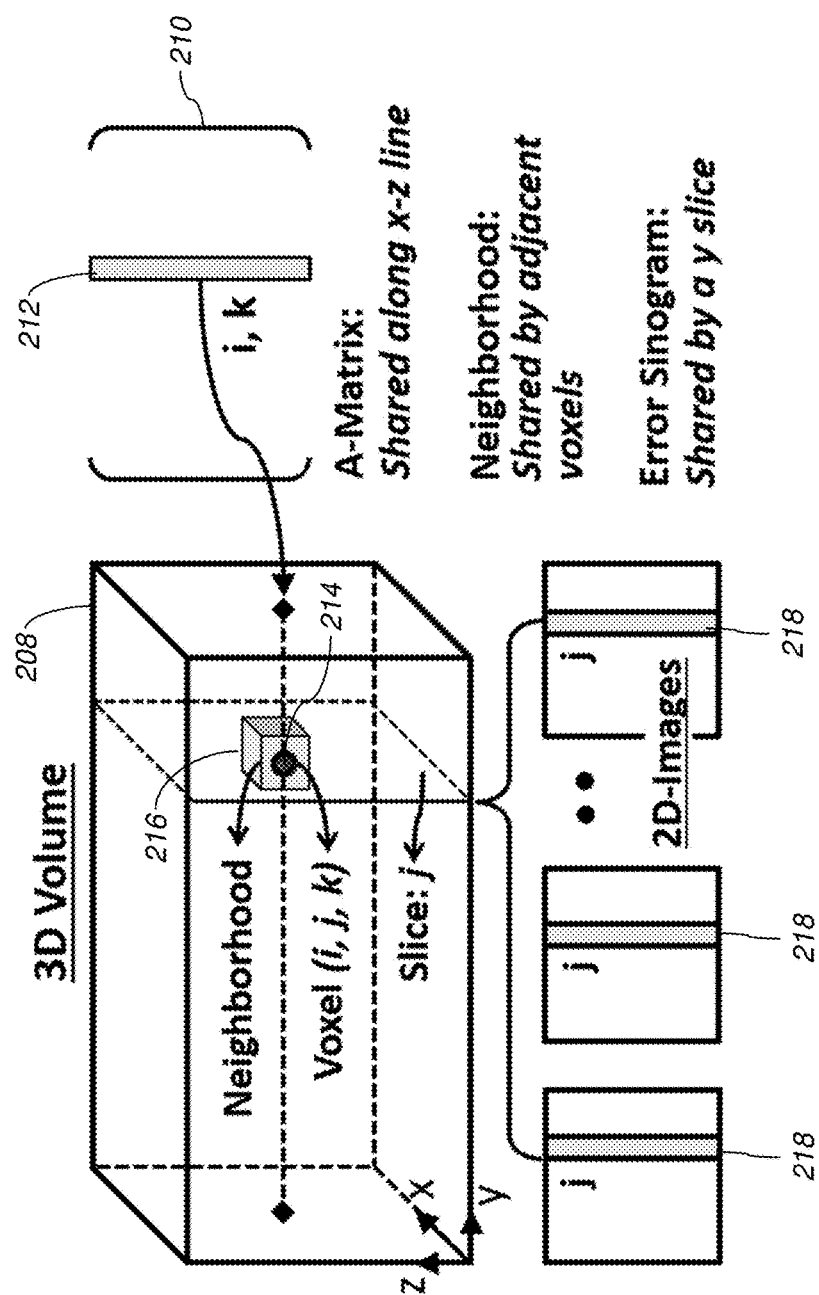
FIG. 2 is a diagram showing an access pattern for voxel update in an MBIR algorithm useful with various aspects.

However, a key challenge with ICD-MBIR is that it is not easily amendable to efficient parallel execution on modern multi-cores and many-core accelerators such as general purpose graphical processing units (GPGPUs) for the following reasons. First, there is limited data parallelism within the core computations that evaluate the updated value of the voxel. From a computational standpoint, each voxel update to create a 3D image 208 involves accessing 3 key data-structures as illustrated in FIG. 2: (i) a column 212 of the A matrix 210, wherein the column 212 is indexed by the x and z co-ordinates of a voxel 214, (ii) voxel neighborhood 216, which refers to the voxels adjacent to the current voxel 214 along all directions, and (iii) portions of the error sinogram, which is determined by slice ID or y co-ordinate of the voxel 214. Since the A matrix column 212 is typically sparse (sparsity ratio of 1000:1), the per-voxel update computations are relatively small (Time/Voxel-update: ~26 μs), and the overheads of parallelization such as task startup time, synchronization between threads, and off-chip memory bandwidth significantly limit performance. In summary, parallelizing computations within each voxel update yields very little performance improvement.

The present disclosure provides a specialized hardware architecture and associated control system to simultaneously improve both the runtime and energy consumption of the MBIR algorithm by exploiting its computational characteristics.

Figure 3:
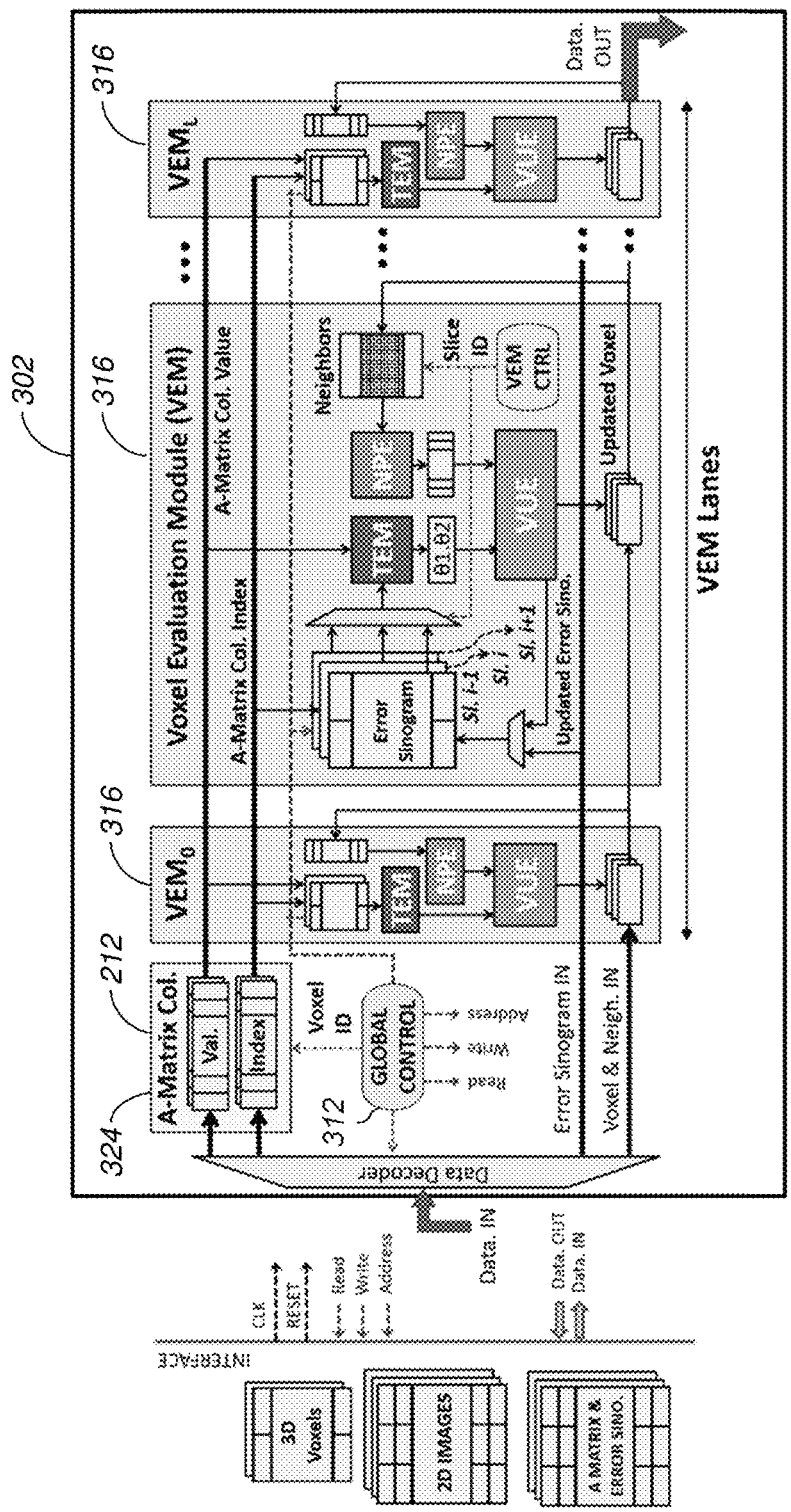
FIG. 3 is a block diagram of an example implementation of hardware specialized to execute the MBIR algorithm useful with various aspects.
Figure 4:
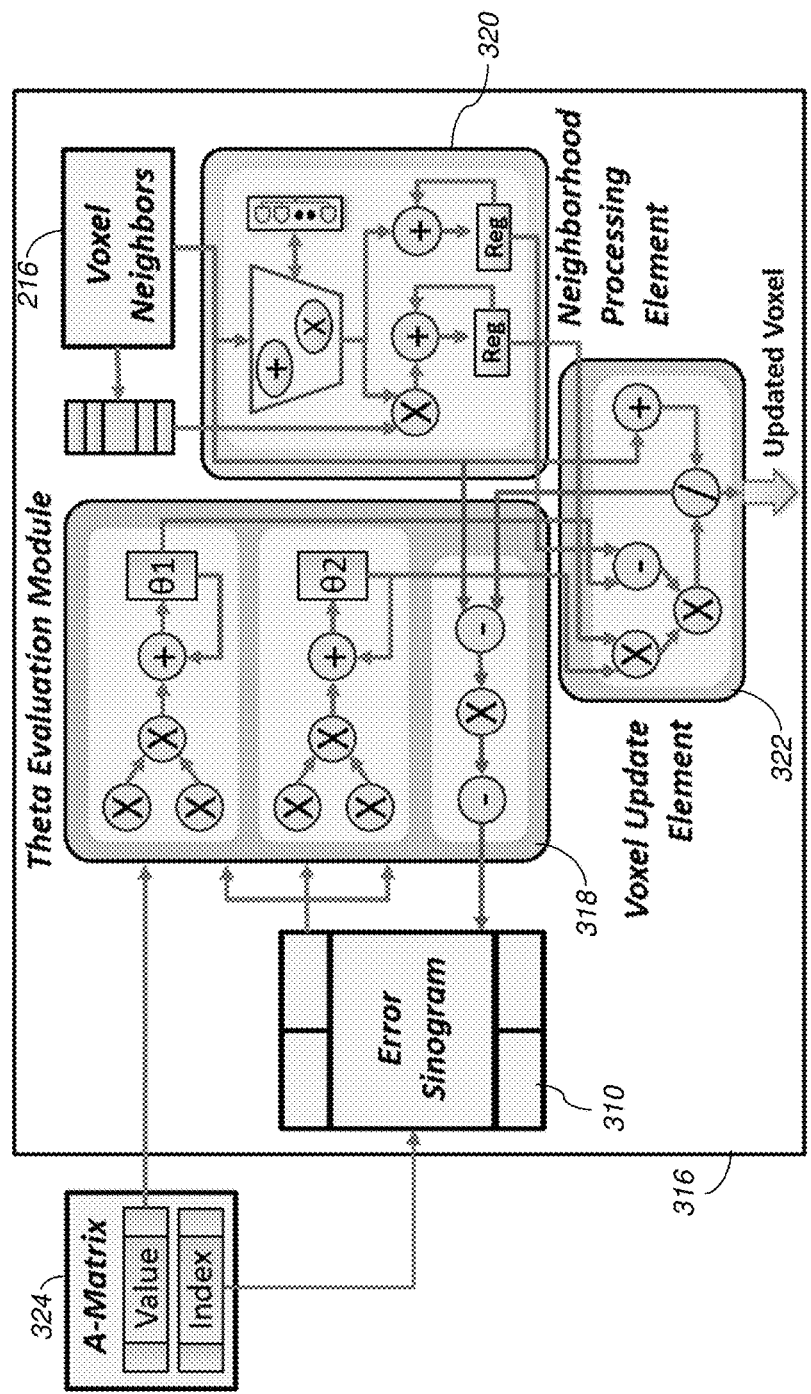
FIG. 4 is a block diagram of a computation engine/Voxel Evaluation Module of FIG. 3 used for voxel update.

FIG. 3 shows a block diagram of the tomography hardware accelerator unit 302 according to one embodiment. The tomography hardware accelerator unit 302 receives as input: 2D measurement data 304, reconstructed 3D volume data 306, A matrix data 308, and error sinogram data 310. In certain embodiments, the 2D measurement data 304, reconstructed 3D volume data 306, A matrix data 308, and error sinogram 310 may be stored in memory blocks external to and operatively connected to the tomography hardware accelerator unit 302. The tomography hardware accelerator unit 302 may also include a global control unit 312 containing appropriate control registers and logic to initialize the location of the external memory blocks and generate interface signals 314 for sending/receiving inputs/outputs to and from the tomography hardware accelerator unit 302.

At a high level, operation of the tomography hardware accelerator unit 302 can be summarized as follows. First, the global control unit 312 generates a random voxel ID (x,y,z coordinates). Based on the co-ordinates, the tomography hardware accelerator unit 302 retrieves the following data from the system memory 106 which is required to update the voxel 214: a column 212 of the A matrix 210, a portion of the error sinogram 310, and the voxel neighbor data 216 (which is a portion of the volume data 306). The tomography hardware accelerator unit 302 may include internal memory blocks to store these data structures. The updated value of the voxel 214 is then computed by the tomography hardware accelerator unit 302 and stored back to the external system memory 106. This process is repeated until the convergence criterion is met.

The tomography hardware accelerator unit 302 may also comprise one or more voxel evaluation modules 316. Each voxel evaluation module 316 may comprise a theta evaluation module 318, a neighborhood processing element 320, and a voxel update element 322. Each of the theta evaluation module 318, neighborhood processing element 320, and voxel update element 322 may comprise one or more computer processors and associated memory for performing calculations on the received data.

The TEM 318 evaluates the variables $\theta_1$ and $\theta_2$ of the MBIR algorithm. The NPE 320 applies a complex one-to-one function on each of the neighbor voxels. The VUE 322 uses the outputs of TEM and NPE to compute the updated value of the voxel 214 and the error sinogram 310. The processing elements 318, 320 and 322 may comprise hardware functional blocks such as adders, multipliers, registers etc. that are interconnected to achieve the desired functionality, in some cases, over multiple cycles of operation. The VEM 316 may also contain memory blocks that store the column 212 of A matrix 210, portions of the error sinogram 310 and the voxel neighbor data, all of which may be accessed by the TEM 318, NPE 320 and VUE 322. Since the A matrix is sparse, it may be stored as an adjacency list using First-In-First-Out (FIFO) buffers in certain embodiments. A controller present within the engine is designed to fetch the necessary data if it is not already available in the internal memory blocks of the VEM 316.

The VEM 316 operates as follows. First, the elements of the A matrix column 212 are transferred into the TEM 318. The TEM 318 utilizes the index of the A matrix elements to address the error sinogram 310 memory to obtain the corresponding error sinogram 310 value. The TEM 318 performs a vector reduction operation on the A matrix 212 and error sinogram 310 values to obtain $\theta_1$ and $\theta_2$. In parallel to the TEM 318, the NPE 320 operates on each of the voxel's neighbors data and stores the processed neighbor values in a FIFO memory located in the VEM 316. Since the TEM 318 and NPE 216 operate in parallel, the performance of the VEM 316 is maximized when their latencies are equal. This is achieved by proportionately allocating hardware resources in their implementation. The output of the TEM 318 and NPE 320 is directed to the VUE 322, which computes the updated value of the voxel 214. This involves performing a vector reduction operation on the voxel neighborhood 216, followed by multiple scalar operations. The entries in the error sinogram 310 memory are also updated based on the updated value of the voxel 214. Finally, the voxel 214 data is written back to the system memory 106. Thus, the VEM 316 efficiently computes the updated value of a voxel.

In certain embodiments, the performance of the computation engine can be further improved by operating it as a two-level nested pipeline. The first-level pipeline is within the TEM 318. In this case, the VEM 316 leverages the pipeline parallelism across the different elements of the vector reduction. When the TEM 318 computes on a given A matrix element, the error sinogram value for the successive element is fetched from the error sinogram memory in a pipelined manner. The second level pipelining exploits the parallelism across successive voxels. In this case, the VEM 316 concurrently transfers data required by the subsequent voxel, even as the previous voxel is being processed by the VEM 316. Thus, both pipeline levels improve performance by overlapping data communication with computation.

Each execution of the VEM 316 requires the A matrix column 212, the error sinogram 310 and the voxel neighbor data 216 to be transferred from the system memory 106 to the VEM 316. To minimize data transfer overhead, in certain embodiments, the VEM 316 reuses the data stored in the internal memory blocks of the VEM 316 across multiple voxels. Since voxels in a slice 218 share the same portion of the error sinogram 310 (FIG. 2), the VEM 316 constrains the sequence in which the voxels 214 are updated in the VEM as follows: First, a slice 218 is selected from the volume 208 at random. Then, all voxels 214 in the slice 218 are updated in a random sequence before the next slice is chosen. In this case, the error sinogram 310 needs to be fetched only once per slice, and all voxels within the slice can re-use the data. Thus the data transfer cost for the error sinogram 310 is amortized across all voxels 214 in the slice 218. This optimization can be simply realized by modifying the global control unit 312 that generates the voxel ID. In other words, the global control unit 312 may be programmed to select voxels for updating in an order that processes a majority of voxels from the same slice together.

In certain embodiments, the VEMs 316 are arranged as an array of L lanes, each containing a dedicated TEM 318, NPE 318, and VUE 322. To ensure convergence of the MBIR algorithm, the voxels that are to be updated in parallel are chosen to be located far apart in the 3D volume. To maximize the distance of separation, the voxels may be selected from different slices 218 that are equally and entirely spread out across the y dimension (FIG. 2) of the 3D volume 208.

Figure 5:
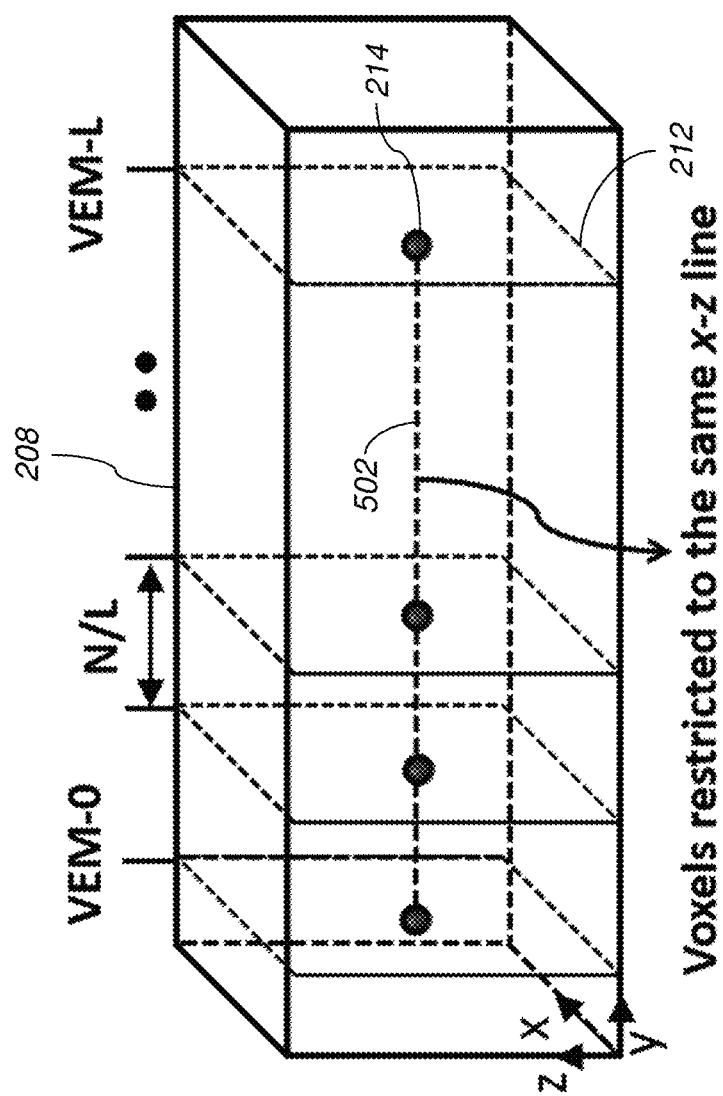
FIG. 5 shows a scheme where constraining voxels on a x-z line enables sharing of A-Matrix Column.
Figure 6:
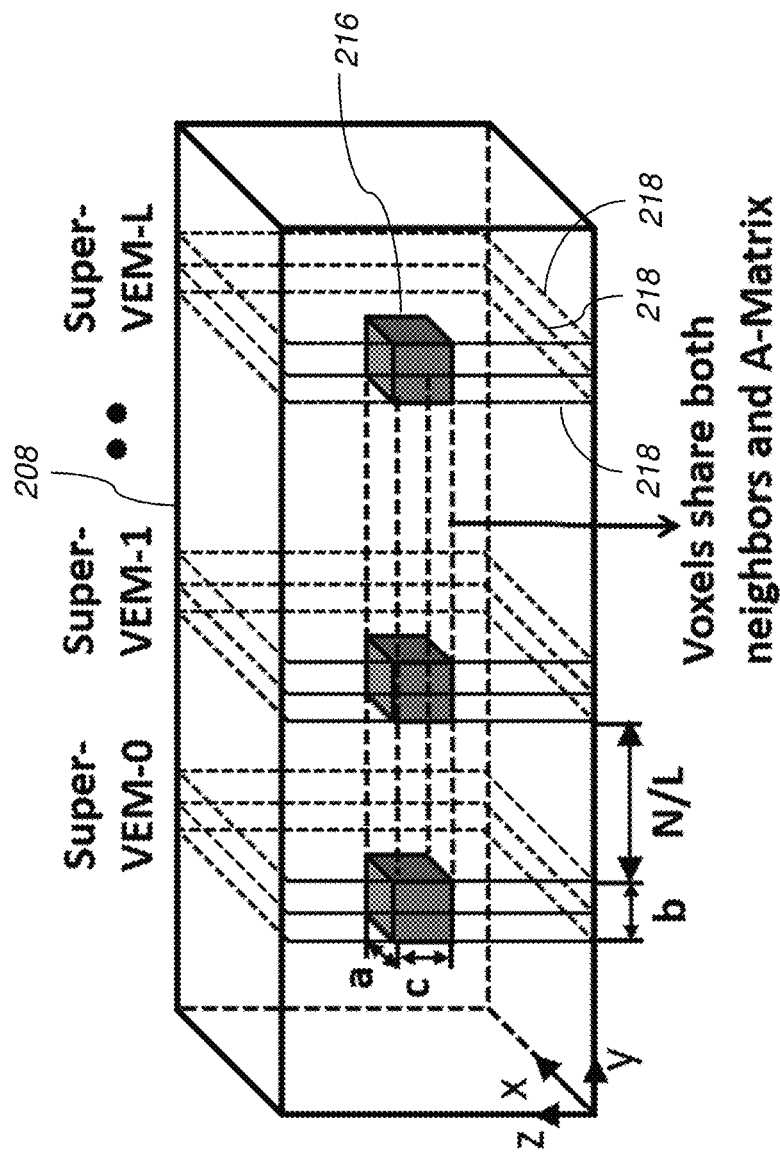
FIG. 6 shows a scheme where a neighborhood is reused if each computation engine is designed to update a volume around the selected voxel.

In certain embodiments, as shown in FIG. 5, the tomography hardware accelerator unit 302 restricts concurrently updated voxels to lie on a straight line in the volume. In the embodiment illustrated in FIG. 5, the line 502 is parallel to the y axis of the volume 208 (i.e. they have the same x,z coordinates), although any straight line in the volume may be used. Since A matrix columns are indexed only using the x and z co-ordinates (FIG. 2), concurrently updated voxels 214 share the same A matrix column 212, thereby linearly reducing the A matrix data transfer time. This optimization does not impact convergence, as the slices from which the voxels 214 are picked lie sufficiently far apart (the y dimension of the volume is much larger than the number of parallel voxel updates). As shown in FIG. 3, an A matrix memory 324 may be placed outside the VEMs 316 and shared by all VEMs 316 during operation. Before each execution of the VEM array, the neighborhoods for all voxels 214 and one A matrix column 212 are transferred from the system memory 106 to the memory 324. This results in a net reduction of L−1 A matrix column transfers per execution, where L is the number of VEMs 316 in the tomography hardware accelerator unit 302.

In certain embodiments, the neighborhood voxel data transfer time may be reduced by concurrently updating the neighborhood volume 216 of size a×b×c (x,y,z directions) around the voxel 214. Each VEM 316 is then used to update one of the voxels 214 in the volume 216 in a parallel fashion. To facilitate the neighbor voxel reuse, in certain embodiments, the capacity of the neighborhood memory is sized to hold all of the data for voxels in the neighborhood volume 216. Also, once the updated value of a voxel is computed, it needs to be written to the neighborhood memory 216 within the VEM 316 (in addition to the system memory 106), as subsequent voxels in the volume use the updated value. Also, the since the adjacent voxels along the y direction belong to different slices, the error sinogram memory in the VEM 316 may be replicated to hold data corresponding to each slice 218 in the volume 216. Along similar lines, voxels within the slice 218 use different A matrix columns, and correspondingly the A matrix memory is also replicated. The TEM 318, NPE 320 and VUE 322 are not replicated in the VEM 316 in such embodiments, as voxels in the volume 216 are evaluated sequentially. Finally, the global control unit 312 and VEMs 316 are modified to appropriately index these memories and evaluate all voxels within the neighborhood volume 216.

Steps of various methods described herein can be performed in any order except when otherwise specified, or when data from an earlier step is used in a later step. Exemplary method(s) described herein are not limited to being carried out by components particularly identified in discussions of those methods.

Various aspects provide more effective processing of CT data. A technical effect is to improve the functioning of a CT scanner by substantially reducing the time required to process CT data, e.g., by performing MBIR or other processes to determine voxel values. A further technical effect is to transform measured data from a CT scanner into voxel data corresponding to the scanned object.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, "computer storage media" do not include communication media. That is, computer storage media do not include communications media consisting solely of a modulated data signal, a carrier wave, or a propagated signal, per se.

The program code can include computer program instructions that can be loaded into processor 186 (and possibly also other processors), and that, when loaded into processor 486, cause functions, acts, or operational steps of various aspects herein to be performed by processor 186 (or other processor). The program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The invention is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless otherwise explicitly noted. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected within the spirit and scope of the invention.

The invention claimed is:

1. A tomography system, comprising:
   a microprocessor;
   a system memory communicatively connected to the microprocessor; and
   a hardware accelerator communicatively connected to the microprocessor and the system memory, the hardware accelerator configured to perform at least a portion of an MBIR process on computer tomography data; and
   one or more voxel evaluation modules (VEMs) that evaluates an updated value of a voxel given a voxel location in a reconstructed volume;
   wherein the hardware accelerator is configured to identify voxel data required to update a voxel and fetch the voxel data from the system memory;
   wherein the VEM contains VEM memory blocks internal to the VEM, which stores voxel data needed to compute the updated voxel value; and
   wherein the VEM is configured to assess voxel data stored in the VEM memory blocks, re-use said voxel data stored in the VEM memory blocks across multiple voxel evaluations, and partially fetch unavailable voxel data from the system memory.

2. The system according to claim 1, further comprising an electronic display, the display operatively connected to the microprocessor, the electronic display configured to display a reconstructed image based on the computer tomography data.

3. The system according to claim 1, further comprising a computer tomography scanner, wherein the computer tomography scanner is configured to irradiate a test object, measure resulting radiation, and provide measured data corresponding to the resulting radiation.

4. The system according to claim 1, wherein hardware accelerator comprises a control unit which generates a pseudo-random sequence of voxel locations.

5. The system of claim 1, wherein the VEM is configured to perform data transfer operations and data processing operations in parallel.

6. The system of claim 1 wherein the VEM is configured to perform data transfer operations and data processing operations in a pipelined manner.

7. The system of claim 1, wherein the hardware accelerator fetches data required for a voxel from the system memory, while computations corresponding to a different voxel are in progress.

8. The system of claim 1, wherein the hardware accelerator comprises a plurality of VEMs, the VEMs configured to update multiple voxels in parallel.

9. The system of claim 8, wherein a sequence of voxels updated on a VEM is constrained to enhance data reuse within the hardware accelerator.

10. The system of claim 8 in which at least one next voxel processed on a given VEM is constrained to lie within a common slice as the previous voxel processed on the VEM, thereby enabling the error sinogram memory to be reused.

11. The system of claim 8 in which voxels updated concurrently on multiple VEMs are constrained such that they share at least one entry of an A matrix of the tomography data.

12. The system of claim 11 where the said shared entry of the A matrix is fetched only once from the system memory and used by multiple VEMs.

13. The system of claim 8 in which adjacent voxels are updated on the same VEM, enabling neighborhood voxel data to be shared between the voxels.

14. The system of claim 8 where each VEM is configured to update a voxel neighborhood around a given voxel, the neighborhood comprising voxels adjacent to the given voxel.

* * * * *